United States Patent [19]
Roth et al.

[11] Patent Number: 5,582,065
[45] Date of Patent: Dec. 10, 1996

[54] ASSEMBLY WITH TWO BEVEL GEAR ANGLE DRIVES

[75] Inventors: Andreas Roth, Neunkirchen-Seelscheid; Stefan Rauschenbach, Grosspostwitz, both of Germany

[73] Assignee: GKN Walterscheid GmbH, Lohmar, Germany

[21] Appl. No.: 313,729

[22] Filed: Sep. 27, 1994

[30] Foreign Application Priority Data

Sep. 29, 1993 [DE] Germany .............. 43 33 034.7

[51] Int. Cl.⁶ .................................................. B60K 17/28
[52] U.S. Cl. .................................... 74/15.69; 74/385
[58] Field of Search ............... 74/11, 15.6, 15.69, 74/385, 417

[56] References Cited

U.S. PATENT DOCUMENTS

| | | | |
|---|---|---|---|
| 1,768,472 | 6/1930 | Frankie | 74/385 |
| 2,764,899 | 10/1956 | West | 74/385 |
| 2,792,858 | 5/1957 | Bryant | 74/385 |
| 3,896,894 | 7/1975 | Vinton | 74/385 |
| 4,860,526 | 8/1989 | Hottes | 74/15.69 |
| 5,339,907 | 8/1994 | Roth | 172/68 |

*Primary Examiner*—Richard M. Lorence
*Assistant Examiner*—David Fenstermacher
*Attorney, Agent, or Firm*—Harness, Dickey & Pierce

[57] ABSTRACT

A drive assembly has two bevel gear angle drives (9, 10) for driving an agricultural implement (2) via a tractor power take-off shaft. The assembly has a pivot bearing (11) which effects a pivotable connection between the two bevel gear angle drives (9, 10). To improve the bearing conditions between the two bevel gear angle drives (9, 10) the two housings (22, 23) of the bevel gear angle drives (9, 10) are provided with bearing sleeves (24, 25). The bearing sleeves (24, 25), in the fitted condition, project into the interior (34) of a housing (23), to reduce the axial distance between the two connecting journals (13, 16) associated with the bevel gears (41, 43) which engage the bevel gears (49, 57) arranged on the connecting shaft (67), thus improving the force receiving conditions.

16 Claims, 2 Drawing Sheets

ASSEMBLY WITH TWO BEVEL GEAR ANGLE DRIVES

BACKGROUND OF THE INVENTION

The invention relates to an assembly with two bevel gear angle drives, for driving an agricultural implement which is attached to a tractor via a power take-off shaft. The two bevel gear angle drives are pivotable relative to one another, via a pivot bearing arranged around a connecting shaft, around the rotational axis of the connecting shaft common to both bevel gear angle drives. The pivot bearing includes two bearing sleeves each one being connected to one of the two housings and arranged coaxially around one another. The connecting shaft axially extends through the bore of the inner one of the two bearing sleeves. The two bevel gear angle drives each include a housing which supports the connecting shaft. The connecting shaft, on its portion extending into a housing, non-rotatably supports a bevel gear which engages a further bevel gear connected to a connecting journal which extends out of the associated housing at a right angle relative to the connecting shaft.

An assembly is described in EP 0 124 462 A1, published Nov. 11, 1984, where two bevel gear angle drives are provided with flanged-on bearing sleeves which are arranged outside the drives and which may be pivoted relative to one another by a friction bearing. On the one hand, the connecting shaft is supported indirectly in the bearing sleeves by bevel gears connected to the shaft and on the other hand, it is supported directly in the housings of the two bevel gear angle drives. As such assemblies are used for articulatingly connecting a tractor to an implement and as, in consequence, towing forces are transmitted, quite considerable lever arms occur which are due to the distance between the two bevel gear angle drives which results from the in-between arrangement of the bearing means. A further disadvantage exists in that the towing forces may cause jamming because the bearing means are overloaded; there is one bearing in the bearing sleeves and one in the housings.

In order to improve the bearing conditions, EP 0 434 915 A2, published Jul. 3, 1991, describes a solution. Here, the connecting shaft is supported in the bearing sleeves only. Furthermore, the bearing sleeves are held relative to one another by means of tapered roller bearings.

SUMMARY OF THE INVENTION

It is an object of the invention to provide an assembly of the above type which improves the force receiving conditions applied by the towing force. Also, the invention eliminates any negative effects on the functioning of the drives.

In accordance with the invention, the objective is achieved by arranging the two bevel gears rotatably connected to the connecting shaft towards the housing wall facing away from the pivot bearing in the direction of the rotational axis of the connecting shaft. The two bearing sleeves extend into the housing of one of the bevel gear angle drives and are supported by spaced bearings to be pivotable relative to one another. At least one of the two bearings is arranged in the interior of the housing into which the bearing sleeves project. The connecting shaft axially extends through the bore of the inner bearing sleeve with a certain amount of play.

An advantage of this embodiment is that the axial distance between the two connecting journals is greatly reduced. Thus, as a result of the shortened lever arms, even high towing forces do not adversely affect the bearing means. Further, by integrating the bearing sleeves in the housings it is possible to improve the supporting conditions to which the entire housing contributes. Furthermore, by directly supporting the bevel gears non-rotatably connected to the connecting shaft, it is possible in the housings to prevent the towing force from adversely affecting the functioning of the individual drives since the connecting shaft may be freely adjusted relative to the bevel gears to prevent jamming. The strength of the pivot bearing may be improved by designing at least one of the two bearing bushes integral with its associated housing.

A particularly advantageous embodiment is achieved if the bevel gears associated with the connecting shaft are supported by a rolling contact bearing in their respective housings.

To connect the connecting shaft to its associated two bevel gears, it is proposed that the ends of the connecting shaft are each non-rotatably received in a bore of a bevel gear. Each bevel gear includes a seat face for the inner ring of the associated rolling contact bearing.

With reference to their rotational axis, to accommodate the axial forces resulting from the transmission of torque, the bevel gears are axially supported against the inner ring of the rolling contact bearing. The bevel gear outer rings are axially supported against the associated housing.

The connecting shaft may be arranged in a floating way. To accomplish shaft floating, it is proposed that the connecting shaft be axially held between the bevel gears by collars and that the connecting shaft, via spring means supported against one bevel gear, is axially loaded in the direction of the other bevel gear. The spring means is preferably supported against an end face of the connecting shaft. Furthermore, as proposed by the invention, the spring means includes a securing ring secured to a bevel gear, a spring and at least one supporting disc. To keep the spring force as constant as possible, one of the supporting discs may be provided in the form of an adjusting disc.

To put the invention into effect, the rolling contact bearings associated with the bevel gears cooperating with the connecting shaft may be provided in the form of deep-groove-ball bearings.

According to a further proposal, the bearing sleeve of one housing includes an inner portion which extends into the interior of the housing and an outer portion which extends outwardly towards the other housing. The outer portion projects into an annular recess of the bearing sleeve of the housing associated with the first bevel gear angle drive.

As a result of this measure it is possible to fit the two drive housings into one another in a particularly advantageous way. A further advantage is achieved by integrating the bearing sleeves into the housings. The associated bearing means of the pivot bearing may be integrated directly into the lubrication circuit of one of the drives.

To complement the above proposal, one of the rolling contact bearings of the pivot bearing is received in the bearing bore of the outer portion which projects into the annular recess. A seal, which has a sealing function towards the outside, is inserted between the outer portion and the annular recess.

Particularly advantageous strength conditions for the bearing sleeves are achieved by the bearing sleeve which extends towards the interior having a stepped bore to accommodate the inner bearing sleeve which projects from the first housing and whose outer face is stepped accordingly.

For supporting the bearing sleeves of the pivot bearing relative to one another, it is preferable to select rolling contact bearings which are designed as tapered roller bearings.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment and its application in the connection between a tractor and an implement to be driven or towed by the tractor is illustrated in, and explained with reference to, the drawings wherein.

DETAILED DESCRIPTION OF THE PREFERRED EMBODIMENTS

Figure 1:
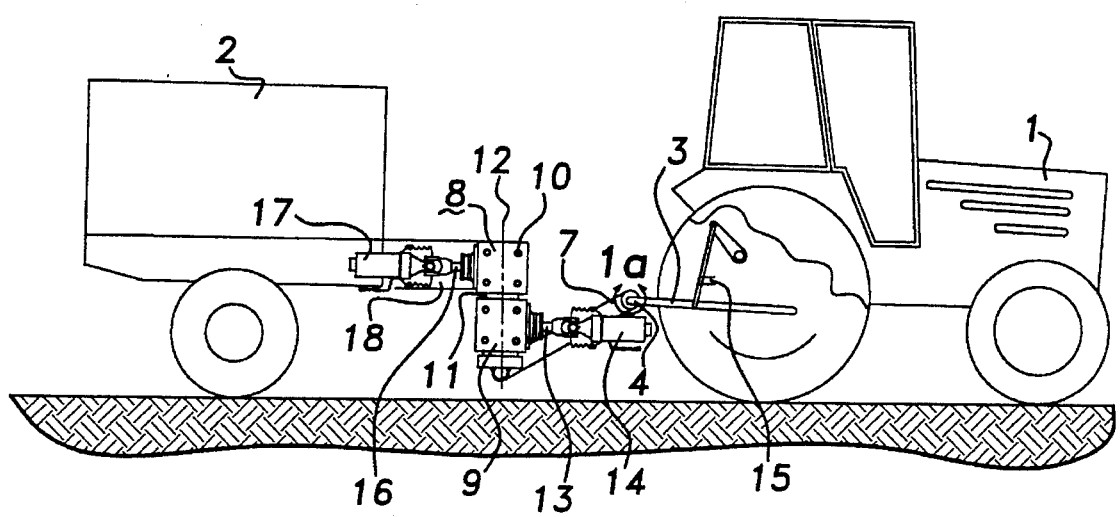
FIG. 1 is a schematic side view of a tractor and an implement to be attached to the tractor and to be driven by the power take-off shaft of the tractor, using an assembly in accordance with the invention.
Figure 1A:
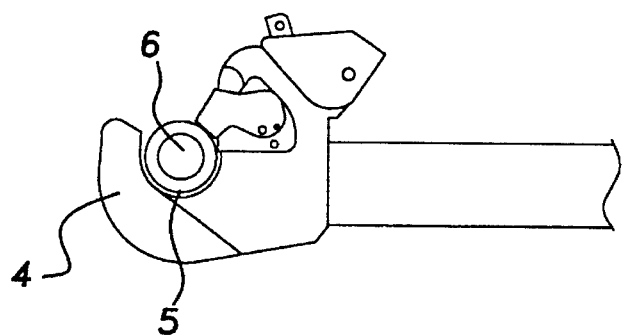
FIG. 1a is an enlarged detail view with circle X of FIG. 1.
Figure 2:
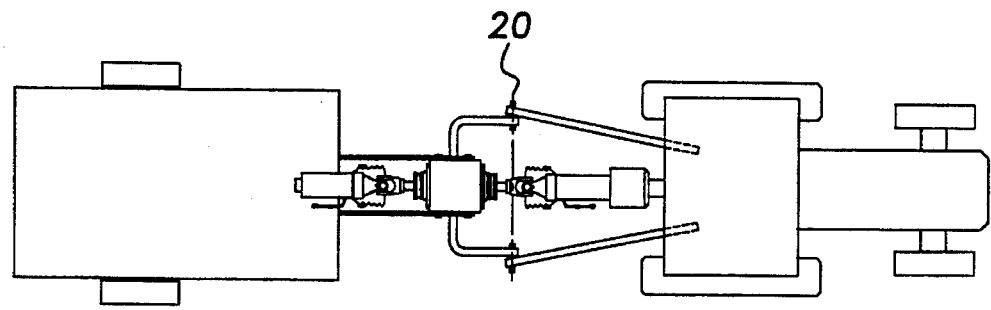
FIG. 2 is a top plan view according to FIG. 1.

FIGS. 1 and 2 show the tractor 1 with an attached implement 2, with the lower steering arms 3 used for attachment purposes. The free ends of the lower steering arms 3 are provided with coupling hooks 4 which may be connected to a bearing arm 7 carrying a drive assembly 8. The bearing arm 7 includes two crimped ends attached to a bearing pin 6 holding a bearing ball 5 which is received by the coupling hook 4. The bearing arm 7 is connected to the first bevel gear angle drive 9 of the drive assembly 8 via articulatable attaching means as described in connection with FIG. 3.

The second bevel gear angle drive 10 is arranged above the first bevel gear angle drive 9. The two drives are pivotably connected around a pivot axis 12 by a pivot bearing 11. The second bevel gear angle drive 10 is connected to the implement 2 by means of a towing arm 18. The towing force of the tractor 1 is transmitted by the lower steering arms 3 on to the bearing arm 7, the drive assembly 8 and transferred by its second bevel gear angle drive 10 via the towing arm 18 to the implement 2. In this way it is ensured that in addition to the implement 2 being pivotable relative to the tractor 1 around a pivot axis 12, for example when negotiating curves, it is possible for the tractor 1 and implement 2 to be inclined relative to one another around the axis 20 when uneven surface conditions occur. When the tractor and implement 2 are inclined relative to one another, a balancing effect is also achieved by the articulatable attaching means between the towing arm 7 and the first bevel gear angle drive 9 as described in connection with FIG. 3.

The drive assembly 8 establishes a driving connection between the power take-off shaft 15 of the tractor and the driveshaft 17 at the implement end. The driveshaft 17 transmits the driving movement of the power take-off shaft to the implement 2. The power take-off shaft 15 is connected to the driveshaft 14 which is also non-rotatably connected to the connecting journal 13 of the first bevel gear angle drive 9. The torque is transmitted further by the first bevel gear angle drive 9 to the second bevel gear angle drive 10 and from there, by its connecting journal 16, to the driveshaft 17.

Figure 3:
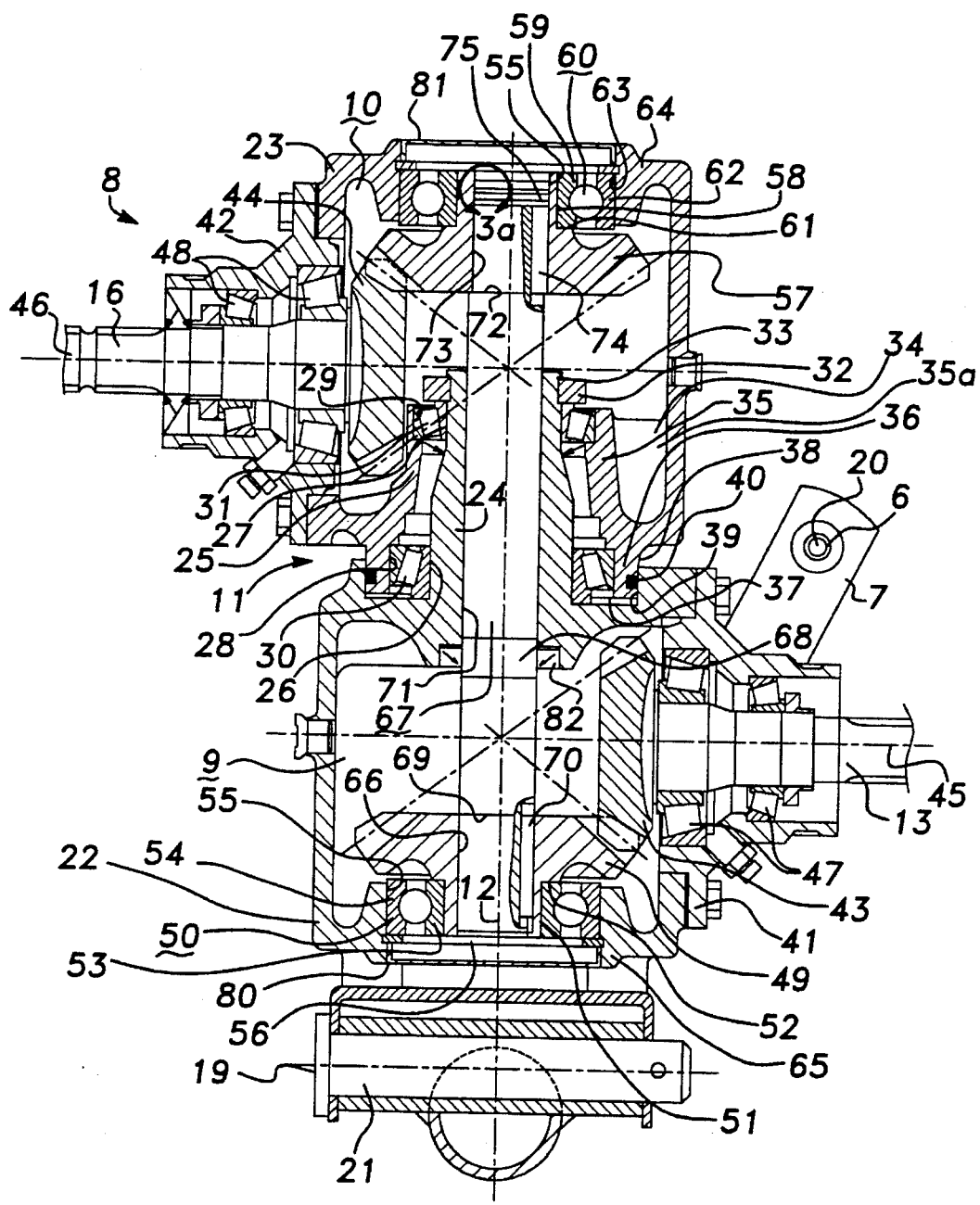
FIG. 3 is a sectional view of a drive assembly according to the invention of FIG. 1.
Figure 3A:
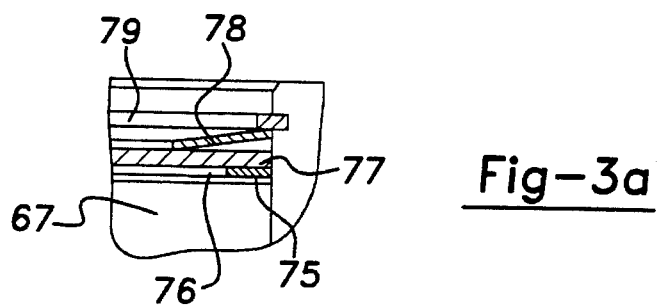
FIG. 3a is an enlarged detail view within circle Z according to FIG. 3.

FIGS. 3 and 3a better illustrate the drive assembly 8. It is also possible to see the bearing arm 7 which, via a sleeve connected thereto and a pivot pin 21, may be pivotably connected around the pivot axis 19 to the bearing block attached to the housing 22 of the first bevel gear angle drive 9.

The housing 22 of the first bevel gear angle drive 9 includes a first bearing sleeve 24 which is integral with the housing 22 and projects outwardly from a wall. The first bearing sleeve 24 is stepped, with its diameter reduced from a first bearing seat 26 to a spaced second bearing seat 27. Furthermore, the bearing seat 26 extends into an annular recess 37 in the wall of the housing 22. The inner ring of a tapered roller bearing 30 is slid onto the first bearing seat 26. Furthermore, the inner ring of the tapered roller bearing 31 is positioned on the second bearing seat 27 of the first bearing sleeve 24.

The housing 23 of the second bevel gear angle drive 10 with a second bearing sleeve 25 is slid onto the first bearing sleeve 24 and the bearings 30, 31. The second bearing sleeve 25 forms part of the housing 23. The bearing sleeve 25 includes a first inner portion 35 which projects into the interior 34 of the housing 23. Between the outer face of the portion 35 and the adjoining wall of the housing 23 there are arranged ribs 35a. The second bearing sleeve includes an outer portion 36 which extends outwardly from the inner portion 35 towards the housing 22 and projects into the annular recess 37. The bearing sleeve 25 includes two bearing bores. One of the bearing bores 28, serves to accommodate the outer ring of the rolling contact bearing 30. The second bearing bore 29 serves to accommodate the outer ring of the further rolling contact bearing 31.

To tension the bearing unit, the first bearing sleeve 24, on its end which extends into the interior 34, is provided with a thread 33. A nut 32 is threaded onto the thread 33 and rests against the inner ring of the tapered roller bearing 31. The pivot bearing 11 includes the two bearing sleeves 24, 25 and the rolling contact bearings 30, 31 which are arranged therebetween and are secured by the nut 32 and the thread 33.

A seal 40, with outwardly directed sealing functions, is arranged between the outer face 38 of the outer portion 36 of the second bearing sleeve 25 and the inner face 39 of the annular recess 37.

A first flange housing 41 is flanged to the housing 22 of the first bevel gear angle drive 9. The first flange housing 41 is connected to the housing 22 by a threaded connection. A bevel gear 43 provided with a connecting journal is rotatably supported in bearings in the housing 41 around rotational axis 45. The bearings are provided in the form of the two tapered roller bearings 47.

A further flange housing 42 is flanged to the housing 23 of the second bevel gear angle drive 10. The bevel gear 44, defining the rotational axis 46, is rotatably supported in the flange housing 42 by tapered roller bearings 48. The bevel gear 44 is constructed to be integral with the connecting journal 16 and supported thereby in the flange housing 42.

The bevel gear 43, associated with the first bevel gear angle drive 9 and provided with the connecting journal 13, engages a bevel gear 49. The bevel gear 49 is arranged at a right angle relative thereto and is rotatable around the pivot axis 12. The bevel gear 49 includes a bearing seat face 51 and a shoulder 52 against which the inner ring 53 of a deep-groove ball bearing is axially supported. The outer ring 54 of the bearing 50 is received in a bearing bore 55 in the wall 65 of the housing 22 and prevented from displacement by a securing ring 56.

The bevel gear 49 includes a receiving bore 66 for receiving a connecting shaft 67. The connecting shaft 67 is connected to the bevel gear 49 by a wedge 70. The connecting shaft 67 includes a collar 69 which limits the movement of the connecting shaft 67, in the direction of the axis 12, towards the bevel gear 49.

The connecting shaft 67 extends through the bore 71 in the first bearing sleeve 24 into the interior 34 of the housing 23 of the second bevel gear angle drive 10. The end of the connecting shaft 67 projects into a receiving bore 73 of a bevel gear 57 which, by a rolling contact bearing in the form of a deep-groove ball bearing 60, is supported in the bearing bore 63 in the wall 64 of the second housing 23. For this purpose, the bevel gear 57 is provided with a bearing seat face 58 with a shoulder 61 supporting the inner ring 59 of the bearing 60. The outer ring 62 of the deep-groove ball bearing 60 is received in the bearing bore 63 of the housing 23 and axially supported against a securing ring. To limit the movement of the connecting shaft 67, a further collar 72 is provided in the region of the bevel gear 57. The non-rotating connection between the connecting shaft 67 and the bevel gear 57 is again achieved by a wedge 74.

A resilient supporting mechanism is provided for the connecting shaft 67 so that its collar 69 is pushed in the direction of, and contacts, the bevel gear 49 of the first bevel gear angle drive 9.

The mechanism includes a spring 78 whose one end is supported against a securing ring 79 inserted into the bore 73 of the bevel gear 57 as seen in FIG. 3a. The other end of the spring 78 is supported against a supporting disc 77 and an adjusting disc 76. The disc 76, for play adjusting purposes is inserted between the first supporting disc 77 and the end face 75 of the connecting shaft 67. Towards the outside, the housing 23, in the region of the deep-groove ball bearing, is sealed by a cover 80. The first housing 22 is covered by a cover 81 in the region of the deep-groove ball bearing 60.

A seal 82 is inserted between the connecting shaft 67 and the bore 71 of the first bearing sleeve 24. The seal 82 is positioned on a step 68 of the connecting shaft 67. The pivot bearing 11 is lubricated by oil contained in the second bevel gear angle drive 10.

While the above detailed description describes the preferred embodiment of the present invention, the invention is susceptible to modification, variation, and alteration without deviating from the scope and fair meaning of the subjoined claims.

We claim:

1. An assembly with two bevel gear angle drives, for driving an agricultural implement by a power take-off shaft of a tractor to which an implement is attached, comprising:

said two bevel gear angle drives both being pivotable relative to one another around a rotational axis of a connecting shaft common to both bevel gear angle drives by a pivot bearing, arranged around the connecting shaft;

said pivot bearing including two elongated bearing sleeves each one connected to one of two separate housings and arranged coaxially around one another;

said connecting shaft axially extending through a bore of the inner one of the two bearing sleeves and with the two bevel gear angle drives each including one of said two housings in which the connecting shaft is supported;

said connecting shaft, on its portions extending into said housings, supporting a bevel gear which engages a further bevel gear connected to a connecting journal which extends out of the associated housing at a right angle relative to the connecting shaft;

said two bevel gears rotatably connected to the connecting shaft are arranged towards housing walls facing away from the pivot bearing in the direction of the rotational axis of the connecting shaft;

said two bearing sleeves extend into the housing of one of the bevel gear angle drives such that one bearing sleeve extends inward from said one housing and the other bearing sleeve extends outward from the other housing and said bearing sleeves are supported by spaced bearings so as to be pivotable relative to one another;

at least one of the two spaced bearings is arranged in the interior of the housing into which the bearing sleeves project;

and said connecting shaft axially extends with a certain amount of radial clearance, through the bore of the inner bearing sleeve.

2. An assembly according to claim 1, wherein at least one of the two bearing sleeves is designed to be integral with its associated housing.

3. An assembly according to claim 1, wherein each of the bevel gears associated with the connecting shaft are supported by a rolling contact bearing in its associated housing.

4. An assembly according to claim 3, wherein at least one of the two rolling contact bearings provided for the purpose of supporting the connecting shaft is arranged in a bearing bore in the wall of the housing positioned opposite the respective bearing sleeve.

5. An assembly according to claim 4, wherein the ends of the connecting shaft are each non-rotatably received in a bore of the bevel gear and that each bevel gear includes a seat face for the inner ring of the associated rolling contact bearing.

6. An assembly according to claim 4, wherein, with reference to their rotational axis, the connecting shaft bevel gears are axially supported against the inner ring of the rolling contact bearing and that their outer rings are axially supported against its associated housing.

7. An assembly according to claim 4, wherein the connecting shaft is axially held between its bevel gears by collars and the connecting shaft, via spring means supported against one bevel gear, is loaded in the direction of the other bevel gear.

8. An assembly according to claim 7, wherein said spring means is supported against an end face of the connecting shaft.

9. An assembly according to claim 7, wherein the spring means includes a securing ring secured to a bevel gear, a spring and at least one supporting disc.

10. An assembly according to claim 4, wherein the rolling contact bearings for the connecting shaft are provided in the form of deep-groove ball bearings.

11. An assembly according to claim 1, wherein the bearing sleeve of one of said housings includes an inner portion which extends into the interior of the housing and an outer portion which extends outwardly towards the other housing and which projects into an annular recess of the bearing sleeve of the housing associated with the first bevel gear angle drive.

12. An assembly according to claim 11, wherein one of the rolling contact bearings of the pivot bearing is received in the bearing bore of the outer portion which projects into the annular recess.

13. An assembly according to claim 11, wherein a seal is inserted between the outer portion and the annular recess.

14. An assembly according to claim 1, wherein the bearing sleeve extending towards the interior comprises a stepped bore for accommodating the inner bearing sleeve which projects from the first housing and whose outer face is stepped accordingly.

15. An assembly according to claim 14, wherein the bearings are provided in the form of rolling contact bearings.

16. An assembly according to claim 15, wherein the rolling contact bearings of the pivot bearing are provided in the form of tapered roller bearings.

* * * * *